United States Patent [19]

Romantschuk et al.

[11] 4,049,787
[45] Sept. 20, 1977

[54] PROCESS FOR SEPARATING SULPHUR IN THE FORM OF HYDROGEN SULPHIDE FROM CLARIFIED GREEN LIQUOR OBTAINED FROM THE COMBUSTION OF WASTE LIQUOR

[75] Inventors: Håkan Wilhelm Romantschuk; Tuomo Juhani Vuojolainen, both of Tampere, Finland

[73] Assignee: Oy Tampella AB, Finland

[21] Appl. No.: 515,424

[22] Filed: Oct. 16, 1974

[30] Foreign Application Priority Data

Nov. 28, 1973 Finland .................................. 733671

[51] Int. Cl.² .......................................... C01B 17/16
[52] U.S. Cl. .................................. 423/563; 423/422; 423/428
[58] Field of Search ............... 423/563, 428, 427, 421, 423/564, 571, 561, 422, 220; 162/29

[56] References Cited

U.S. PATENT DOCUMENTS

| 2,675,297 | 4/1954 | Gray | 423/428 |
| 2,864,669 | 12/1958 | Ahlborg et al. | 423/202 |
| 3,508,863 | 4/1970 | Kiminki | 423/563 |
| 3,826,710 | 7/1974 | Anderson | 423/220 |
| 3,841,961 | 10/1974 | Saiha | 423/220 |

FOREIGN PATENT DOCUMENTS

| 548,631 | 11/1957 | Canada |
| 584,355 | 10/1959 | Canada |

OTHER PUBLICATIONS

Lange, H. B.; et al; Tappi, vol. 58, No. 2, Feb., 1975; pp. 122-126.
Romantschuk, A.; et al, Chemical Engineering, Sept. 21, 1970, pp. 138-140.

*Primary Examiner*—L. Dewayne Rutledge
*Assistant Examiner*—Michael L. Lewis
*Attorney, Agent, or Firm*—Roylance, Abrams, Berdo & Kaul

[57] ABSTRACT

The invention relates to a process for separating hydrogen sulphide from clarified green liquor, including precarbonating green liquor with a carbon dioxide rich gas, adding alkali bicarbonate to the precarbonated green liquor and stripping hydrogen sulphide therefrom forming simultaneously alkali carbonate, and preparing the alkali bicarbonate used in the process from the alkali carbonate formed. The process of the invention is carried out by performing the hydrogen sulphide stripping without crystallizing the alkali carbonate formed, preparing the alkali bicarbonate partly from alkali carbonate-alkali sulphide solution obtained in the precarbonation step and partly from the non-crystallized alkali carbonate solution, feeding at least a portion of the alkali carbonate — alkali sulphide solution through the carbonation step, and passing the carbon dioxide rich gas first through the carbonation step and thereafter through the precarbonation step.

1 Claim, 1 Drawing Figure

PROCESS FOR SEPARATING SULPHUR IN THE FORM OF HYDROGEN SULPHIDE FROM CLARIFIED GREEN LIQUOR OBTAINED FROM THE COMBUSTION OF WASTE LIQUOR

BACKGROUND OF THE INVENTION

1. Field of the Invention

The present invention relates to a process for separating sulphur in the form of hydrogen sulphide from clarified green liquor obtained from the combustion of waste liquor, a process in which the green liquor is precarbonated with a gas containing carbon dioxide and is then fed, together with a bicarbonate addition, to the separation of hydrogen sulphide, or stripping, whereby an alkali carbonate is simultaneously produced, and the bicarbonate requisite in the process is prepared by carbonation from an alkali carbonate solution.

2. Description of the Prior Art

Several processes are known for the separation of sulphur in the form of hydrogen sulphide from an alkali sulphide solution or from an alkali sulphide solution containing alkali carbonate.

Some of these are the Sivola process, the Mead process, the Stora process, and the Tampella process.

In the Tampella process the sulphide of the alkali carbonate and the alkali sulphide solution first reacts at the precarbonation stage with the carbon dioxide of the flue gases, thereby forming alkali bisulphide and alkali carbonate. The separation of sulphur is based on a chemical reaction in the liquid phase between the alkali bisulphide and the alkali bicarbonate, whereby hydrogen sulphide and alkali carbonate are produced. The separation of the hydrogen sulphide is preferably carried out in a multiple bottom column by steam stripping according to Finnish Patent No. 45,576. The method used can be direct steam stripping, or a calorisator can be used, whereby even alkali carbonate can, when so desired, be crystallized for the preparation of the digesting solution according to U.S. Pat. No. 3,508,863.

In the Tampella process the alkali bicarbonate required for the separation of hydrogen sulphide is prepared from alkali carbonate in a separate carbonator. This alkali carbonate has usually been crystallized in the lower part of the stripping unit, or a so-called make-up alkali carbonate is used. In the carbonation reaction, carbon dioxide from the flue gases is absorbed into the alkali carbonate, whereby alkali bicarbonate is formed. The requisite flue gas is often taken from the furnace for burning waste liquor, $CO_2$ 14–16%, or even more advantageously from a lime sludge furnace, where the carbon dioxide content in the dry gases is 20–22 %. The gases are cooled with water at a separate cooling stage from 120°–160° C to 35° C. A great amount of gas is used in the carbonator because the gases pass through the apparatus only once, whereby the utilization degree of carbon dioxide remains under 10% of the total carbon dioxide amount. The alkali carbonate used for the carbonation must be devoid of sulphide in order that a non-desirable generation of hydrogen sulphide be prevented at this stage, for it would pass into the environment along with the flue gases.

The utilization degree of carbon dioxide in the Tampella process is 15–20%, when including the precarbonation and carbonation in the calculation.

SUMMARY OF THE INVENTION

The object of the present invention is to develop the described Tampella process further so that the alkali bicarbonate can be prepared in the sulphide-containing alkali carbonate solution by using the flue gases without hydrogen sulphide being removed along with them. Thereby the utilization degree of the carbon dioxide is considerably improved, notable savings are effected in equipment investment, and the dependability of the process further increases. This is achieved by the process according to the invention, which is characterized in that the separation of hydrogen sulphide is carried out so that the alkali carbonate is not crystallized but the bicarbonate is prepared partly from the alkali carbonate solution obtained from the separation of hydrogen sulphide and partly from the alkali carbonate — alkali bisulphide solution obtained from the precarbonation and fed entirely or partially through the carbonation stage to the separation of hydrogen sulphide. The gas containing carbon dioxide is fed first to the carbonation stage and then to the precarbonation stage to reabsorb into the green liquor the hydrogen sulphide originating in the residual sulphide, before the gas is let out of the system. In the process according to the invention, the gases used for the carbonation and the precarbonation are preferably flue gases from the soda furnace or the mesa furnace, and the flue gases are circulated in the carbonation stage.

By directing the flue gases in the described manner, the utilization degree of the carbon dioxide in the process can be raised very high, to approx. 70%. Then only one-fourth of the flue gas amount according to the previous process is required and the cooling water requirement at the flue gas cooling stage is substantially reduced. As the alkali carbonate need not be crystallized for the separation of hydrogen sulphide, considerable savings are effected in equipment investment, since the calorisator and its circulation pumps and crystal-separation devices can be totally eliminated.

BRIEF DESCRIPTION OF THE DRAWING

The annexed schematic drawing illustrates an apparatus designed for the application of the process according to the invention.

DESCRIPTION OF THE PREFERRED EMBODIMENT

Figure 1:
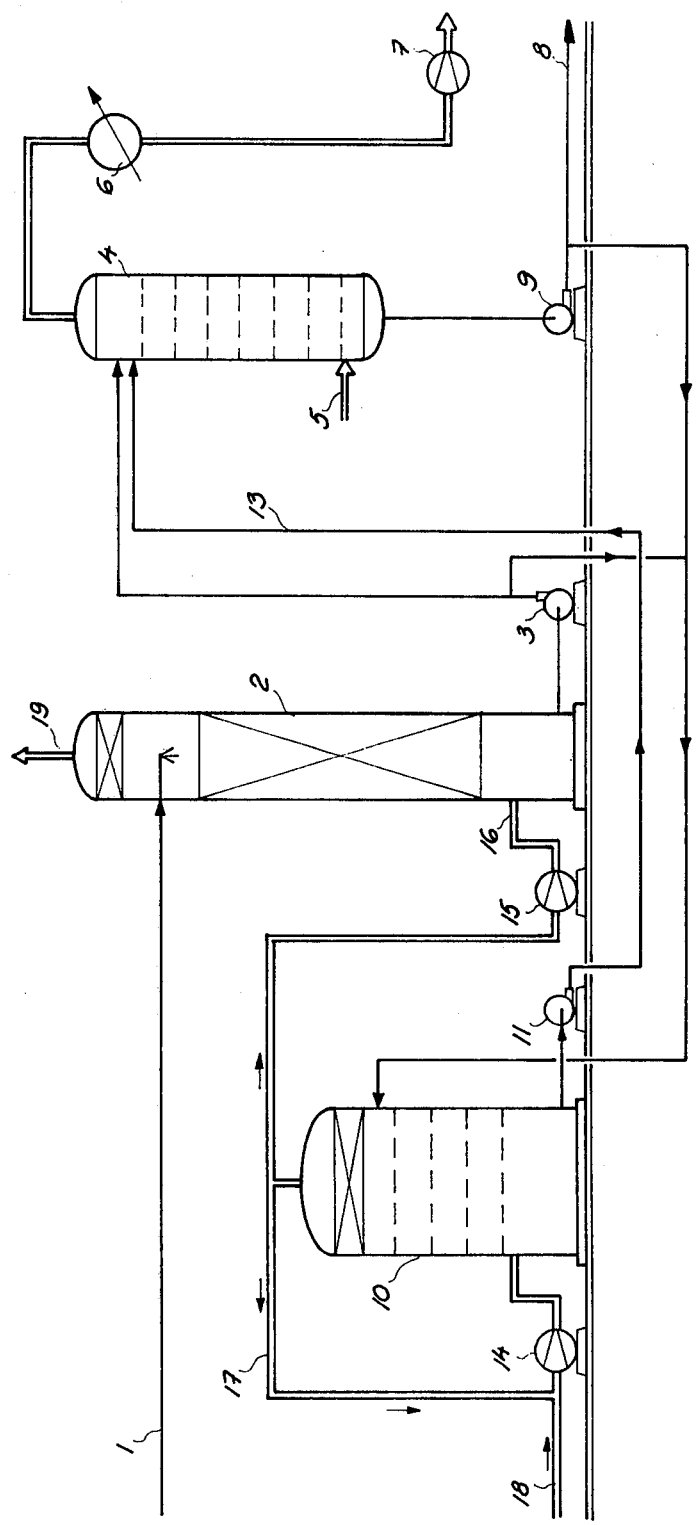

From the concentrated waste liquor combusted in the soda furnace, a melt is obtained which in conventional manner is dissolved in water to produce green liquor, and the solids are removed from the green liquor by sedimentation. Clarified green liquor 1 is pumped into the pre-carbonation tower 2, where the sodium sulphide of the green liquor reacts with the carbon dioxide of the flue gases 16 thereby forming sodium bisulphide. From the precarbonation stage 2 the green liquor is pumped 3 partially to the carbonation stage 10 and partially directly to the stripping stage 4, to which sodium bicarbonate 13 prepared at the carbonation stage is also pumped simultaneously. Steam 5 is fed into the lower part of the stripper 4 to cause the hydrogen sulphide to pass from the solution into the steam phase.

Water vapor is condensed from the gas mixture in a surface condenser 6. The pressure found advantageous for stripping, 0.4 atm. vacuum, is generated by a vacuum pump 7, with which the hydrogen sulphide gas is simultaneously transferred further to be burned in, for example, the sulphur furnace.

The solution phase obtained from the lower part of the stripper and containing mainly sodium carbonate and to a lesser extent sodium sulphide, sodium sulphate, and sodium thiosulphate, is pumped 9 partially into the carbonator 10 and the rest 8 to be used in a conventional manner for the preparation of the digesting solution or for other purposes.

At the carbonation stage, sodium bicarbonate is produced from sodium carbonate by the absorption of carbon dioxide into the solution from the flue gases. The flue gases are forced, at a temperature of 30°–45° C, into the carbonator by means of a blower 14. Part of the gases emerging from the carbonator are circulated 17 to the suction side of the blower 14 and the requisite gas is brought as fresh gas 18 from the digester or the mesa furnace. A portion of the gases, corresponding to the fresh gas, is forced with the blower 15 to the precarbonation stage 2 and from there out of the process 19. At the precarbonation stage the hydrogen sulphide originating in the carbonation stage is absorbed from the flue gas into the green liquor arriving in the process and having a very high alkalinity.

By at least partly preparing bicarbonate directly from the precarbonated green liquor, an advantage is achieved in that the amount of solution to be treated at the stripping stage and its steam consumption are reduced. On the other hand, along with an increasing sulphide content in the solution to be carbonated, the hydrogen sulphide amount separating from the carbonation stage also increases finally to such a great extent that it cannot be totally recarbonated into the green liquor in the precarbonation tower. Usually, for this reason part of the precarbonated green liquor must be directed past the carbonation stage 2 directly to the stripping 4 and the sulphide content of the solution of the carbonation stage 10 must be lowered with the solution from the stripping.

An example is presented to illustrate the process according to the invention.

EXAMPLE

Green liquor flow 10 m³/h, strength 180 g Na₂O act./1, sulphidity 50%. Thereby Na₂CO₃ 14.5 kmol/h and Na₂S 14.5 kmol/h are produced in the green liquor.

To precarbonate the said amount of green liquor in the reaction

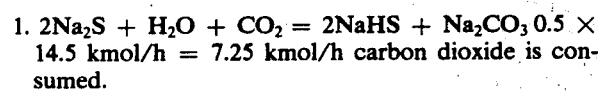
1. $2Na_2S + H_2O + CO_2 = 2NaHS + Na_2CO_3$ $0.5 \times 14.5$ kmol/h = 7.25 kmol/h carbon dioxide is consumed.

To separate the hydrogen sulphide in the stripping
2. $NaHS + NaHCO_3 = Na_2CO_3 + H_2S$

sodium carbonate is required in an amount at least equivalent to sodium bisulphide, i.e., 14.5 kmol/h.

But it is more advantageous to use sodium bicarbonate in an excess of approx. 20–80%, approx. 18.4 kmol/h.

To produce the said amount of bicarbonate in the carbonation process, carbon dioxide is required according to the reaction

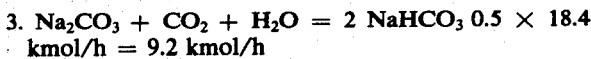
3. $Na_2CO_3 + CO_2 + H_2O = 2 NaHCO_3$ $0.5 \times 18.4$ kmol/h = 9.2 kmol/h The flue gases of the soda furnace contain carbon dioxide 14–16%. Flue gases are circulated in the carbonator and in addition a small portion of fresh gases are used. The carbon dioxide content of the gas decreases at the carbonation stage from 5% to approx. 10%, whereby fresh gas is required for the carbonation at the rate of 3500 Nm³/h.

Gas is removed from the carbonation at the rate of approx. 3300 Nm³/h, the gas containing $CO_2$ 9.7%. Gas is circulated in the carbonator at 14000 Nm³/h, i.e., in total 17500 Nm³/h of gas is blown through the carbonator. All the flue gas, approx. 3300 Nm³/h, emerging from the carbonator is fed to the precarbonation, whereby the possible hydrogen sulphide originating in the residual sulphide is reabsorbed in the precarbonation tower from the flue gas into the green liquor and does not present an environmental hazard. At the precarbonation stage, carbon dioxide is consumed at 7.25 kmol/h, i.e., the outlet gas of the precarbonation (approx. 3130 Nm³/h) contains $CO_2$ 5.0%.

The utilization degree of the carbon dioxide at the carbonation and precarbonation stages is 70%.

What is claimed is:

1. In a process for separating sulphur in the form of hydrogen sulphide from clarified green liquor obtained from the combustion of waste liquor, including the steps of precarbonating green liquor with a carbon dioxide rich gas, adding alkali bicarbonate to said precarbonated green liquor, stripping hydrogen sulphide therefrom producing simultaneously alkali carbonate, and preparing alkali bicarbonate to be used in the process by carbonating said alkali carbonate, the improvement comprising carrying out said hydrogen sulphide stripping step producing simultaneously alkali carbonate directly in the solution in said stripping step without crystallizing said simultaneously produced alkali carbonate, preparing said alkali bicarbonate to be used in the process partly from said alkali carbonate solution and partly from alkali carbonate — alkali sulphide solution obtained in said pre-carbonation step, feeding at least a portion of said alkali carbonate — alkali sulphide solution through said carbonation step to said hydrogen sulphide stripping step, introducing said carbon dioxide rich gas first into said carbonation step and thereafter passing a portion of the gas escaping from said carbonation step back to said carbonation step, and passing another portion into said precarbonation step, and thereafter removing said gas from the process.

* * * * *